US011178061B2

(12) United States Patent
Kondo et al.

(10) Patent No.: US 11,178,061 B2
(45) Date of Patent: *Nov. 16, 2021

(54) INFORMATION PROCESSING APPARATUS, INFORMATION PROCESSING METHOD, INFORMATION PROCESSING SYSTEM, AND STORAGE MEDIUM WITH CONTROL PROGRAM STORED THEREON

(71) Applicant: NINTENDO CO., LTD., Kyoto (JP)

(72) Inventors: Yoshihisa Kondo, Kyoto (JP); Shumpei Yasuda, Kyoto (JP); Toshiki Oizumi, Kyoto (JP); Kouichi Kawamoto, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/654,417

(22) Filed: Oct. 16, 2019

(65) Prior Publication Data

US 2020/0053016 A1 Feb. 13, 2020

Related U.S. Application Data

(63) Continuation of application No. 15/642,567, filed on Jul. 6, 2017, now Pat. No. 10,484,292.

(30) Foreign Application Priority Data

Jul. 7, 2016 (JP) ................................ 2016-134813

(51) Int. Cl.
*H04L 12/801* (2013.01)
*H04L 1/18* (2006.01)

(52) U.S. Cl.
CPC ............ *H04L 47/34* (2013.01); *H04L 1/1874* (2013.01); *H04L 1/1887* (2013.01)

(58) Field of Classification Search
CPC ... H04L 1/1887; H04L 1/1874; H04L 1/1819; H04L 1/1867; H04L 1/1896; H04L 1/189;
(Continued)

(56) References Cited

U.S. PATENT DOCUMENTS 7,114,002 B1 * 9/2006 Okumura .............. H04L 1/1809
370/352
8,594,150 B1 * 11/2013 Husted ................. H04B 1/7143
375/132
(Continued)

FOREIGN PATENT DOCUMENTS

GB    2 373 412 A    9/2002
JP    2004-165920   6/2004
(Continued)

*Primary Examiner* — Phong La
(74) *Attorney, Agent, or Firm* — Nixon & Vanderhye, P.C.

(57) ABSTRACT

An information processing apparatus includes a radio module which wirelessly transmits and receives a packet through synchronous communication to and from another apparatus and a first controller. The first controller determines whether or not the packet transmitted from the radio module has been received by another apparatus, and selects, when reception of a previously transmitted packet by the another apparatus is not confirmed, between retransmission processing for retransmitting the previously transmitted packet and non-retransmission processing for transmitting another packet instead of the previously transmitted packet depending on a content of the previously transmitted packet.

22 Claims, 12 Drawing Sheets

(58) Field of Classification Search
CPC . H04L 1/08; H04L 47/34; H04L 47/27; H04L 47/24; H04L 47/10; H04L 47/11; H04L 41/028; H04W 52/0218; H04W 28/04
See application file for complete search history.

(56) References Cited

U.S. PATENT DOCUMENTS

| | | |
|---|---|---|
| 2003/0005382 A1 | 1/2003 | Chen et al. |
| 2005/0089005 A1 | 4/2005 | Sakoda |
| 2005/0227615 A1* | 10/2005 | Sakoda ............ H04W 52/0219 455/7 |
| 2005/0276249 A1* | 12/2005 | Damnjanovic ....... H04L 1/1887 370/335 |
| 2005/0282494 A1 | 12/2005 | Kossi et al. |
| 2006/0190610 A1 | 8/2006 | Motegi et al. |
| 2007/0111801 A1 | 5/2007 | Haber et al. |
| 2008/0320357 A1* | 12/2008 | Conrad ................. H04L 1/1819 714/751 |
| 2009/0028129 A1 | 1/2009 | Pi |
| 2009/0059891 A1 | 3/2009 | Sakoda |
| 2012/0028631 A1 | 2/2012 | Chun et al. |
| 2012/0069131 A1* | 3/2012 | Abelow ............... G06Q 10/067 348/14.01 |
| 2013/0139018 A1 | 5/2013 | Takada |
| 2013/0314399 A1 | 11/2013 | Abe et al. |
| 2015/0071370 A1 | 3/2015 | Wilhelmsson |
| 2016/0191181 A1 | 6/2016 | Bailey |
| 2018/0013686 A1 | 1/2018 | Kondo et al. |

FOREIGN PATENT DOCUMENTS

| | | |
|---|---|---|
| JP | 2006-217085 | 8/2006 |
| JP | 2012-524496 | 10/2012 |
| JP | 2013-26820 | 2/2013 |
| JP | 2013-246719 | 12/2013 |

* cited by examiner

FIG.8

| REPORT ID | OPERATION 1 | OPERATION 2 | ACCELERATION | GYRO | RESENT |
|---|---|---|---|---|---|
| 1 | 1 | 1 | 1 | 1 | 1 |
| 2 | 1 | 1 | 1 | 0 | 1 |
| 3 | 1 | 1 | 0 | 0 | 0 |
| 4 | 0 | 0 | 1 | 1 | 1 |
| ⋮ | ⋮ | ⋮ | ⋮ | ⋮ | ⋮ |

INFORMATION PROCESSING APPARATUS, INFORMATION PROCESSING METHOD, INFORMATION PROCESSING SYSTEM, AND STORAGE MEDIUM WITH CONTROL PROGRAM STORED THEREON

This is a continuation of U.S. application Ser. No. 15/642,567, filed Jul. 6, 2017, which claims priority to Japanese Patent Application No. 2016-134813 filed with the Japan Patent Office on Jul. 7, 2016, the entire contents of both of which are hereby incorporated by reference.

FIELD

The present disclosure relates to an information processing apparatus which wirelessly transmits and receives a packet through synchronous communication to and from another apparatus, an information processing method performed in the apparatus, an information processing system including the apparatus, and a non-transitory computer-readable storage medium with an executable control program stored thereon that is executed in the apparatus.

BACKGROUND AND SUMMARY

In wirelessly exchanging data, on the assumption that data may disappear (be lost), a function to permit retransmission of the same data is generally mounted.

Resending of the same data as described above is effective in the sense of reliable transmission of data. When retransmission processing is repeated, however, delay will be caused by the time data reaches a destination. Depending on applications of data, transmission of data as latest as possible may be demanded rather than reliable transmission. The background art described above has been unable to sufficiently meet such demands.

The present disclosure provides a configuration which can implement a more flexible form of transmission depending on a type of data in wirelessly transmitting and receiving a packet through synchronous communication to and from another apparatus.

An exemplary embodiment provides an information processing apparatus that includes a radio module which wirelessly transmits and receives a packet through synchronous communication to and from another apparatus and a processor. The processor determines whether or not the packet transmitted from the radio module has been received by another apparatus and selects, when reception of a previously transmitted packet by the another apparatus is not confirmed, between retransmission processing for retransmitting the previously transmitted packet and non-retransmission processing for transmitting another packet instead of the previously transmitted packet depending on a content of the previously transmitted packet.

The packet transmitted from the radio module may contain first sequence information of which value is varied in accordance with prescribed rules each time the packet is transmitted or received. The processor may determine whether or not the packet transmitted from the radio module has been received by another apparatus based on the first sequence information. The radio module may provide the first sequence information of which value has been varied in accordance with the prescribed rules to a packet to be transmitted in any of the retransmission processing and the non-retransmission processing.

The information processing apparatus may further include a buffer memory which stores data to be contained in one packet or a plurality of packets to be transmitted. The selection unit may erase data corresponding to the previously transmitted packet which is stored in the buffer memory, independently of the first sequence information in the non-retransmission processing.

The packet transmitted from the radio module may contain second sequence information of which value is incremented each time data to be transmitted is generated.

The packet transmitted from the radio module may contain second sequence information of which value is incremented each time data is transmitted.

The second sequence information may be longer in data length than the first sequence information.

The first sequence information may be used for determination as to whether or not an individual packet has reached a destination. The second sequence information may be used for determination as to whether or not all of data necessary for an application at the destination have been received.

The packet transmitted from the radio module may contain information indicating whether the packet has been transmitted in accordance with the retransmission processing or the non-retransmission processing.

The radio module may transmit information indicating that the information processing apparatus has an ability of the non-retransmission processing.

The information processing apparatus may further include an operation portion which accepts an operation input by a user. The radio module may have the packet contain information representing a content of the operation input by the user onto the operation portion.

The information processing apparatus may further include a detector which senses at least one of an attitude and a motion of the information processing apparatus. The radio module may have the packet contain information representing a result of sensing by the detector.

The processor may prohibit the non-retransmission processing of a packet containing information on calibration of at least one of the operation portion and a detector.

The radio module may transmit and receive the packet with a communication channel to be used being switched among a plurality of communication channels at any timing in accordance with frequency hopping.

The information processing apparatus may further include a storage which temporarily holds a program to be installed in another apparatus. The processor may prohibit the non-retransmission processing of a packet containing the entirety or a part of the program to be installed in another apparatus.

The processor may have a next packet contain information based on (a) information which represents a content of an operation input by a user and is contained in the previously transmitted packet and (b) information which represents a content of an operation input by the user onto an operation portion and is obtained before transmission of the next packet, when the non-retransmission processing has been selected and reception of the previously transmitted packet by another apparatus is not confirmed.

The processor may combine (a) information which represents the content of the operation input by the user and is contained in one or more packets of which reception by another apparatus is not confirmed and (b) information which represents the content of the operation input by the user and is obtained at a current time point and have the next packet contain the combined information.

The processor may combine (a) information which represents the content of the operation input by the user and is contained in a most recently transmitted packet and (b) information which represents the content of the operation input by the user and is obtained at a current time point and have the next packet contain the combined information, when reception of the most recently transmitted packet by another apparatus is not confirmed.

An exemplary embodiment provides an information processing method that includes wirelessly transmitting and receiving a packet through synchronous communication to and from another apparatus, determining whether or not the transmitted packet has been received by another apparatus, and selecting, when reception of a previously transmitted packet by the another apparatus is not confirmed, between retransmission processing for retransmitting the previously transmitted packet and non-retransmission processing for transmitting another packet instead of the previously transmitted packet depending on a content of the previously transmitted packet.

An exemplary embodiment provides an information processing system that includes a processor which executes a control program and a radio module which wirelessly transmits and receives a packet through synchronous communication to and from another apparatus. The control unit determines whether or not the packet transmitted from the radio module has been received by another apparatus and selects, when reception of a previously transmitted packet by the another apparatus is not confirmed, between retransmission processing for retransmitting the previously transmitted packet and non-retransmission processing for transmitting another packet instead of the previously transmitted packet depending on a content of the previously transmitted packet when the determination unit is unable to confirm reception of the previously transmitted packet by another apparatus.

An exemplary embodiment provides a non-transitory computer-readable storage medium with an executable control program stored thereon, the control program being executed by a processor of an apparatus having a radio communication unit which wirelessly transmits and receives a packet through synchronous communication to and from another apparatus. The control program causes the processor to carry out determining whether or not the packet transmitted from the radio communication unit has been received by another apparatus and selecting, when reception of a previously transmitted packet by the another apparatus is not confirmed, between retransmission processing for retransmitting the previously transmitted packet and non-retransmission processing for transmitting another packet instead of the previously transmitted packet depending on a content of the previously transmitted packet when reception of the previously transmitted packet by another apparatus is not confirmed.

An exemplary embodiment provides an information processing apparatus that includes an operation portion which accepts an operation input by a user, a radio communication unit which wirelessly transmits through synchronous communication to another apparatus, a packet containing information representing a content of the operation input by the user onto the operation portion, a processor which determines whether or not the packet transmitted from the radio communication unit has been received by another apparatus, and a processor which has a next packet contain information based on (a) information which represents the content of the operation input by the user and is contained in a previously transmitted packet and (b) information which represents a content of the operation input by the user onto the operation portion and is obtained before transmission of the next packet, when the determination unit is unable to confirm reception of the previously transmitted packet by another apparatus.

The processor may combine (a) information which represents the content of the operation input by the user and is contained in one or more packets of which reception by another apparatus is not confirmed and (b) information which represents the content of the operation input by the user and is obtained at a current time point and have the next packet contain the combined information.

The processor may combine (a) information which represents the content of the operation input by the user and is contained in a most recently transmitted packet and (b) information which represents the content of the operation input by the user and is obtained at a current time point and have the next packet contain the combined information when reception of the most recently transmitted packet by another apparatus is not confirmed.

The processor may determine reception by another apparatus based on an acknowledgement from another apparatus.

The information processing apparatus may further include a detector which senses at least one of an attitude and a motion of the information processing apparatus. The radio communication unit may have the packet contain information representing a result of sensing by the detector.

An exemplary embodiment provides an information processing method that includes accepting an operation input by a user, wirelessly transmitting through synchronous communication to another apparatus, a packet containing information representing a content of the operation input by the user onto an operation portion, determining whether or not the transmitted packet has been received by another apparatus, and containing in a next packet, information based on (a) information which represents the content of the operation input by the user and is contained in a previously transmitted packet and (b) information which represents a content of the operation input by the user onto the operation portion and is obtained before transmission of the next packet when reception of the previously transmitted packet by another apparatus is not confirmed.

An exemplary embodiment provides an information processing system that includes a processor which executes a control program and a radio communication unit which wirelessly transmits through synchronous communication to another apparatus, a packet containing information representing a content of an operation input by a user onto an operation portion. The processor determines whether or not the packet transmitted from the radio communication unit has been received by another apparatus and has a next packet contain information based on (a) information which represents the content of the operation input by the user and is contained in a previously transmitted packet and (b) information which represents the content of the operation input by the user onto the operation portion and is obtained before transmission of the next packet when reception of the previously transmitted packet by another apparatus is not confirmed.

An exemplary embodiment provides a non-transitory computer-readable storage medium with an executable control program stored thereon, the control program being executed by a computer having a radio communication unit which wirelessly transmits a packet through synchronous communication to another apparatus. The control program causes the computer to carry out accepting an operation input by a user, wirelessly transmitting and receiving through synchronous communication to and from another apparatus, a packet containing information representing a content of the operation input by the user onto an operation portion, determining whether or not the packet transmitted from the radio communication unit has been received by another apparatus, and containing in a next packet, information based on (a) information which represents the content of the operation input by the user and is contained in a previously transmitted packet and (b) information which represents the content of the operation input by the user onto the operation portion and is obtained before transmission of the next packet when reception of the previously transmitted packet by another apparatus is not confirmed.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 8 shows an exemplary illustrative non-limiting drawing illustrating one example of a report ID stored in a report ID portion in the format shown in FIG. 7.

DETAILED DESCRIPTION OF NON-LIMITING EXAMPLE EMBODIMENTS

Figure 1:
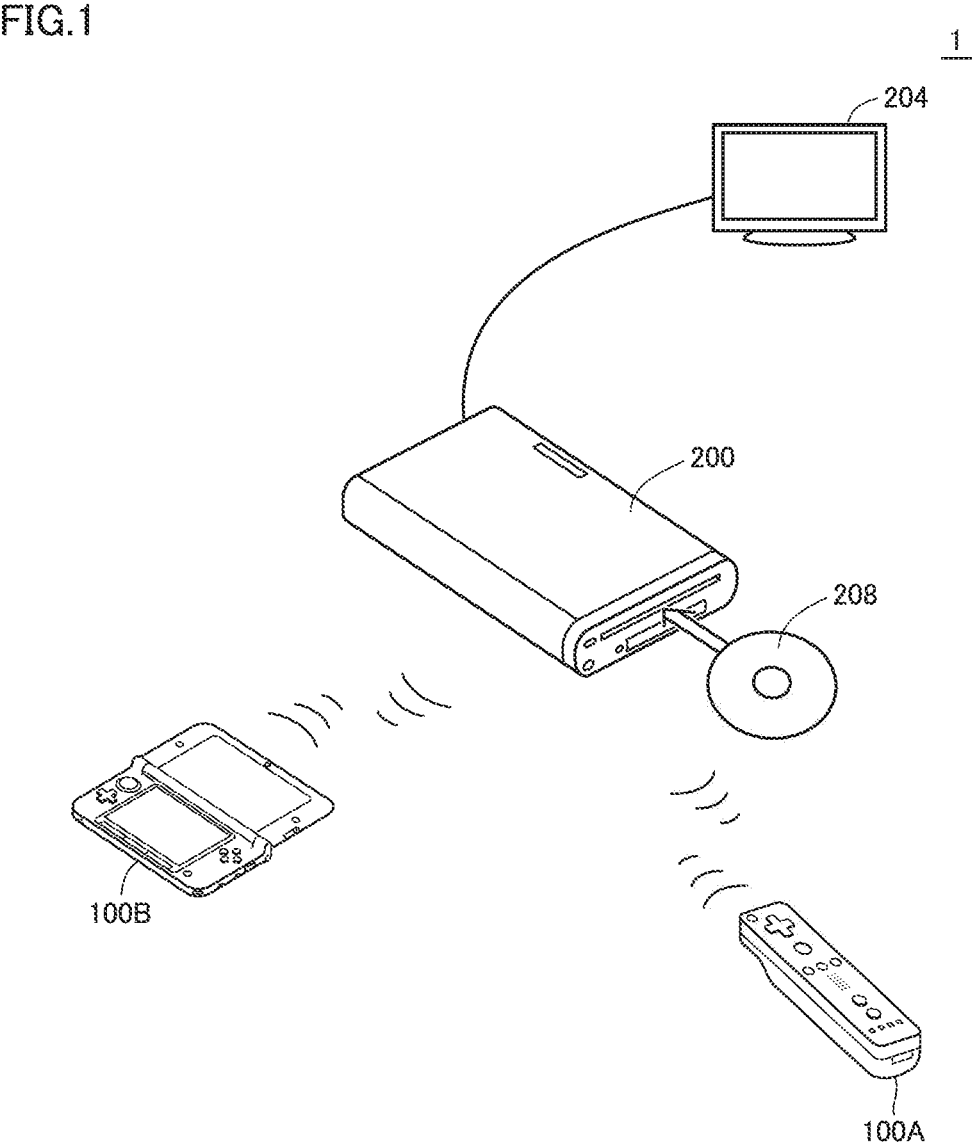
FIG. 1 shows an exemplary illustrative non-limiting drawing illustrating overview of an information processing system according to the present embodiment.

The present embodiment will be described in detail with reference to the drawings. The same or corresponding elements in the drawings have the same reference characters allotted and description thereof will not be repeated.

[A. Apparatus Configuration]

An apparatus configuration involved with an information processing system according to the present embodiment will initially be described.

(a1: Information Processing System)

Overview of an information processing system 1 according to the present embodiment will be described with reference to FIG. 1. Information processing system 1 includes a plurality of information processing apparatuses 100A, 100B, and 200 which can exchange information with one another through radio communication. The information processing system according to the present embodiment is applicable to any application, and FIG. 1 shows a configuration example in which the information processing system is mounted as a game system as a typical example. In the example shown in FIG. 1, information processing apparatus 200 corresponds to a processing main body which executes a game application and information processing apparatuses 100A and 100B (which are hereinafter also collectively referred to as an "information processing apparatus 100") correspond to operation terminals which transmit an operation input by a user to the processing main body.

For the sake of convenience of description, attention is paid below to a communication procedure or the like between information processing apparatus 200 defined as the processing main body and information processing apparatus 100 defined as an operation controller. An application to an example in which information is exchanged between information processing apparatus 100A and information processing apparatus 100B which are operation controllers is also acceptable and further an application to an example in which information is exchanged with yet another apparatus is also acceptable.

An application to various types of radio communication with portable devices such as a smartphone and a tablet is also acceptable without being limited to the game system as shown in FIG. 1.

In information processing system 1, each information processing apparatus wirelessly transmits and receives a packet through synchronous communication to and from another information processing apparatus. Typically, synchronous communication may be implemented on such a framework as Bluetooth® under Institute of Electrical and Electronic Engineers (IEEE) 802.15 standards or wireless local area network (LAN) under IEEE 802.11 standards.

(a2: Operation Terminal)

Figure 2:
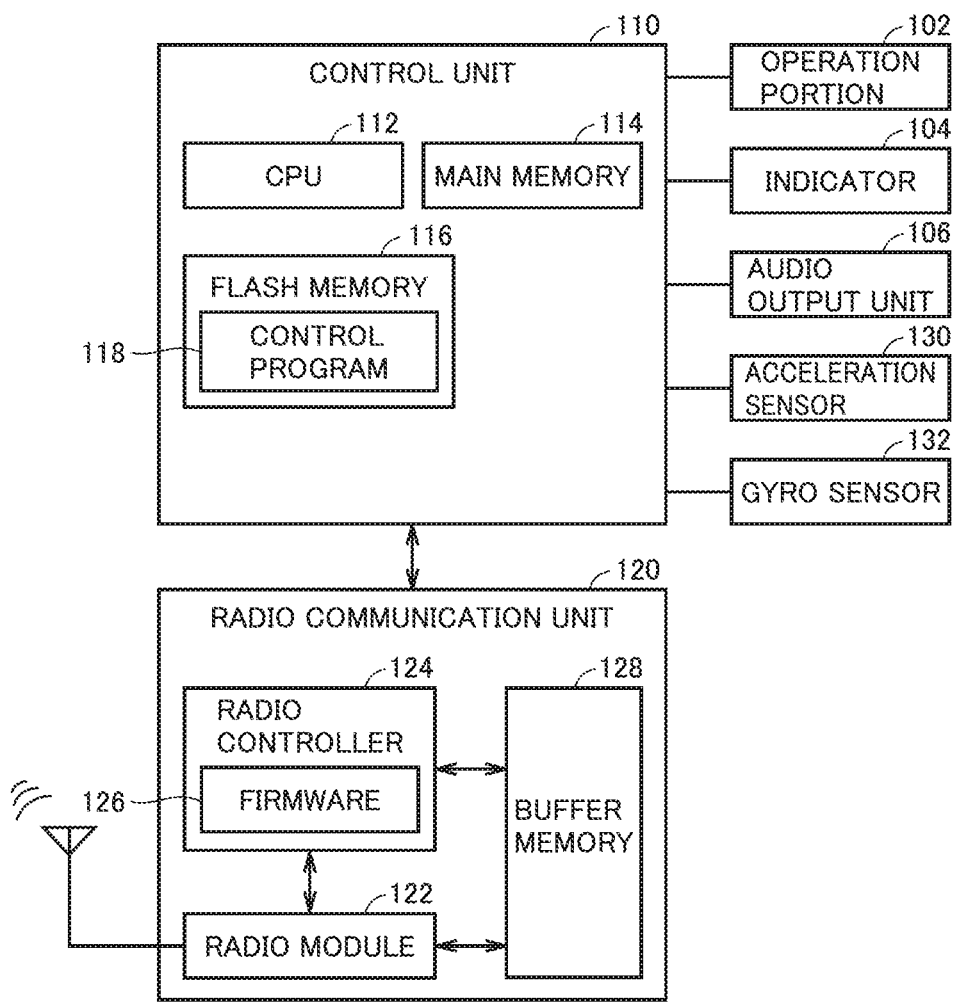
FIG. 2 shows an exemplary illustrative non-limiting drawing illustrating one example of a hardware configuration of an information processing apparatus (an operation terminal) shown in FIG. 1.

One example of a hardware configuration of information processing apparatus 100 (operation terminal) shown in FIG. 1 will be described with reference to FIG. 2. Information processing apparatus 100 may be in any form of mounting so long as it has a function to wirelessly transmit and receive a packet through synchronous communication to and from information processing apparatus 200. By way of example, information processing apparatus 100 includes a control unit 110, a radio communication unit 120, an operation portion 102, an indicator 104, an audio output unit 106, an acceleration sensor 130, and a gyro sensor 132.

Control unit 110 is an entity which controls overall processing in information processing apparatus 100 and includes as its main components, a central processing unit (CPU) 112, a main memory 114, and a flash memory 116 which stores a control program 118. CPU 112 representing one example of a processor implements various types of control as will be described later by reading control program 118 stored in flash memory 116 to main memory 114 and executing the control program.

Control unit 110 may be mounted as a system large scale integration (LSI) including the components described above.

Radio communication unit 120 corresponds to a communication unit which wirelessly transmits and receives a packet through synchronous communication to and from another apparatus. Radio communication unit 120 exchanges a radio signal with another device in accordance with a command from control unit 110 and outputs data received from another device to control unit 110. Radio communication unit 120 includes as its main components, a radio module 122, a radio controller 124, and a buffer memory 128.

Radio module 122 includes a high frequency generation circuit, a modulation circuit, a demodulation circuit, an encoding circuit, and the like. Radio module 122 should only be mounted so as to be able to realize a frequency or a modulation scheme in accordance with a mounted communication scheme. For example, when the Bluetooth® scheme is adopted, radio module 122 may transmit and receive a packet with a communication channel to be used being switched among a plurality of communication channels at prescribed timing in accordance with frequency hopping for lessening influence by burst noise or the like.

Radio controller 124 controls transmission and reception of a radio signal in radio module 122 in accordance with firmware 126 which is an embedded control program. Buffer memory 128 temporarily stores data (a packet) sent from radio module 122 and data (a packet) received by radio module 122. Buffer memory 128 is typically implemented by a first-in first-out (FIFO) memory and data write and read into and from buffer memory 128 is controlled by radio controller 124 and control unit 110. Buffer memory 128 may be arranged in control unit 110 not in radio communication unit 120, or arranged at a portion other than control unit 110 and radio communication unit 120.

Operation portion 102 accepts an operation input by a user and outputs information representing a content of the operation input by the user to control unit 110. Typically, operation portion 102 includes a push button, an operation lever, a touch panel, a mouse, and the like. Alternatively, a controller which is separate from information processing apparatus 100 and connected through a wire or radio may be included as operation portion 102.

Indicator 104 is arranged as being exposed at a surface of information processing apparatus 100 and gives a visual notification to a user in accordance with a command from control unit 110. Typically, indicator 104 includes a light emitting diode (LED) and the like.

Audio output unit 106 is arranged as being partially exposed at the surface of information processing apparatus 100 and gives an auditory notification to a user in accordance with a command from control unit 110. Typically, audio output unit 106 includes one or more speakers or the like.

Acceleration sensor 130 senses an acceleration generated in information processing apparatus 100 and outputs a result of sensing to control unit 110. Gyro sensor 132 senses an inclination or the like of information processing apparatus 100 and outputs a result of sensing to control unit 110. At least one or both of acceleration sensor 130 and gyro sensor 132 can be used to sense at least one of an attitude and a motion of information processing apparatus 100.

(a3: Processing Main Body)

Figure 3:
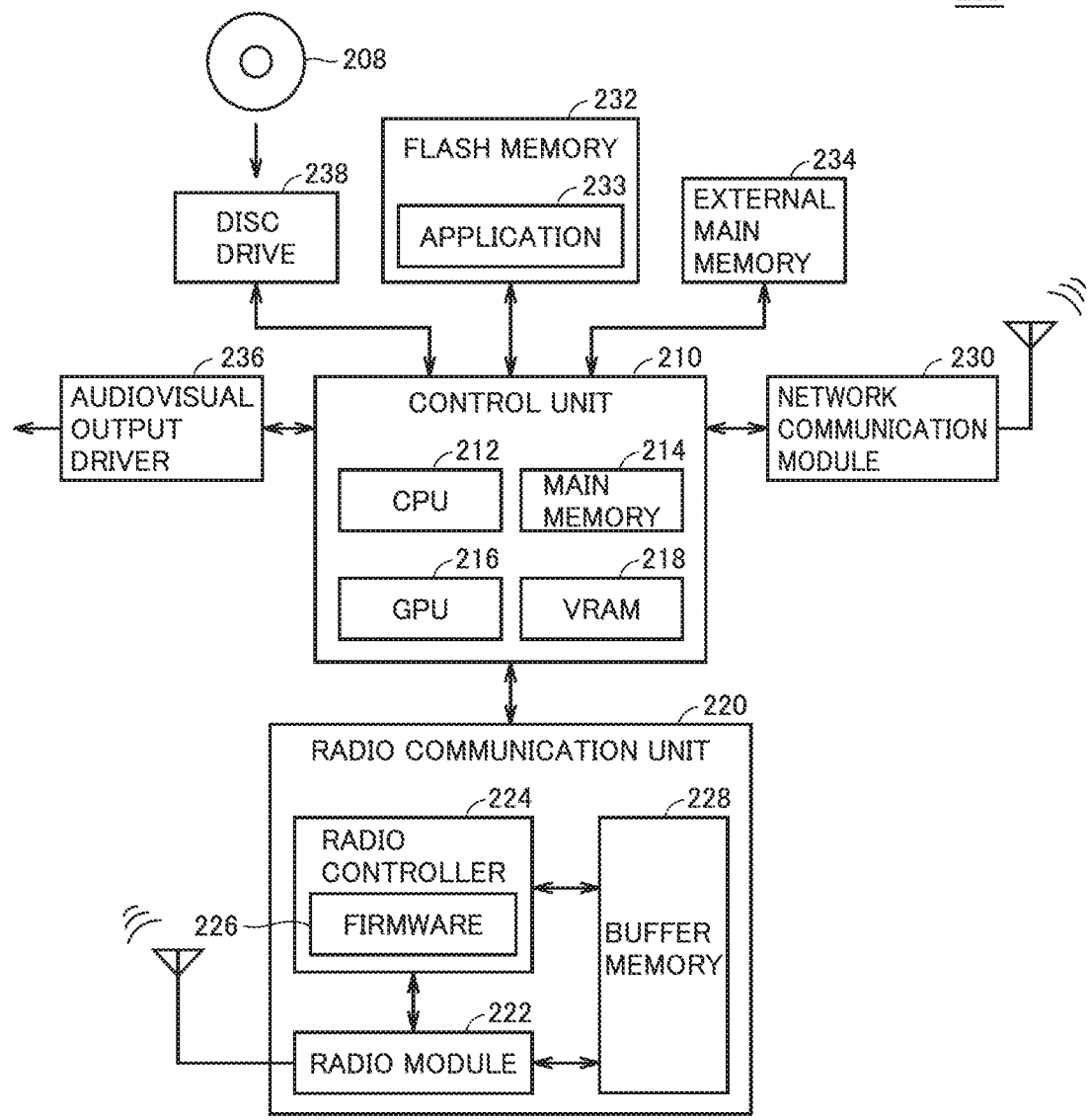
FIG. 3 shows an exemplary illustrative non-limiting drawing illustrating one example of a hardware configuration of an information processing apparatus (a processing main body) shown in FIG. 1.

One example of a hardware configuration of information processing apparatus 200 (processing main body) shown in FIG. 1 will be described with reference to FIG. 3. Information processing apparatus 200 is one type of a computer and includes as its main components, a control unit 210, a radio communication unit 220, a network communication module 230, a flash memory 232, an external main memory 234, an audiovisual output driver 236, and a disc drive 238.

Control unit 210 is an entity which controls overall processing in information processing apparatus 200 and includes as its main components, a CPU 212, a main memory 214, a graphical processing unit (GPU) 216, and a video random access memory (VRAM) 218. CPU 212 executes a basic system program or an application. Main memory 214 functions as a working memory which temporarily holds data necessary for execution of a program by CPU 212. GPU 216 performs processing mainly involved with representation. VRAM 218 functions as a working memory for showing an image generated in processing in GPU 216.

Control unit 210 may be mounted as a system large scale integration (LSI) including the components described above.

Radio communication unit 220 corresponds to a communication unit which wirelessly transmits and receives a packet through synchronous communication to and from another apparatus. Radio communication unit 220 exchanges a radio signal with another apparatus in accordance with a command from control unit 210 and outputs data received from another apparatus to control unit 210. Radio communication unit 220 may basically similar in hardware configuration to radio communication unit 120 shown in FIG. 2. Radio communication unit 220 includes as its main components, a radio module 222, a radio controller 224 in which firmware 226 is embedded, and a buffer memory 228.

Network communication module 230 includes various circuits for radio communication with a device such as an access point. Network communication module 230 may be mounted, for example, with wireless local area network (LAN) under IEEE 802.11 standards, infrared communication, or mobile communication under long term evolution (LTE).

Since radio communication unit 220 and network communication module 230 both include a circuit for radio communication, they may be mounted on the same chip.

Flash memory 232 can be accessed from control unit 210 and holds a basic system program or an application in a non-volatile manner. For example, flash memory 232 may store various applications 233. Application 233 is read from an optical recording medium 208 by disc drive 238 and installed.

External main memory 234 may function as a working memory in coordination with main memory 214 in control unit 210.

Audiovisual output driver 236 outputs a video signal and an audio signal output from control unit 210 to display 204 (see FIG. 1).

[B. Communication Procedure]

A procedure involved with radio communication in information processing system 1 according to the present embodiment will now be described. In information processing system 1 shown in FIG. 1, a packet is transmitted or received through synchronous communication between the information processing apparatuses. Overview of synchronous communication will initially be described and processing in an example where a packet or acknowledge (which is hereinafter also denoted as "ACK") fails to reach a reception side in synchronous communication for some reason, that is, data is lost, will be described.

"Synchronous communication" herein means such a scheme that data is successively transmitted while arrival of data to a reception side is confirmed each time the data is transmitted between a transmission side and the reception side. In a typical processing procedure, when a transmission side transmits data to one reception side and thereafter the reception side receives the data, the reception side returns acknowledge (ACK) indicating reception of the data to the transmission side. The transmission side transmits next data only when the transmission side receives ACK from the reception side within a prescribed period of time, that is, only when reception of previously transmitted data by the reception side has been confirmed. When the transmission side fails to receive ACK from the reception side within the prescribed period of time, reception of the previously transmitted data by the reception side is not confirmed. Therefore, the data is regarded as having disappeared (having been lost) for some reason and the previously transmitted data is retransmitted. The information processing apparatus on the transmission side determines whether or not the reception side has received a packet based on acknowledge from the information processing apparatus on the reception side.

"Synchronous communication" is a scheme for successively transmitting data with successful transmission from the transmission side to the reception side being confirmed, and transmission of data and acknowledge (ACK) is repeated between the transmission side and the reception side. In such synchronous communication, a period of transmission and reception may be managed with time slots at a prescribed time interval with timing being synchronized between the transmission side and the reception side.

Overview of retransmission processing involved with synchronous communication according to the present embodiment will be described first. Though a sequence example where the Bluetooth® scheme is adopted will be described as a typical example below, this example is also similarly applicable to an example in which another communication scheme is adopted. Under the Bluetooth® scheme, a master and a slave are distinguished from each other, and in a basic communication procedure, the master first performs polling and thereafter the slave responds.

A sequence in retransmission processing involved with synchronous communication in information processing system 1 according to the present embodiment will be described with reference to FIGS. 4A to 4C.

Figure 4A:
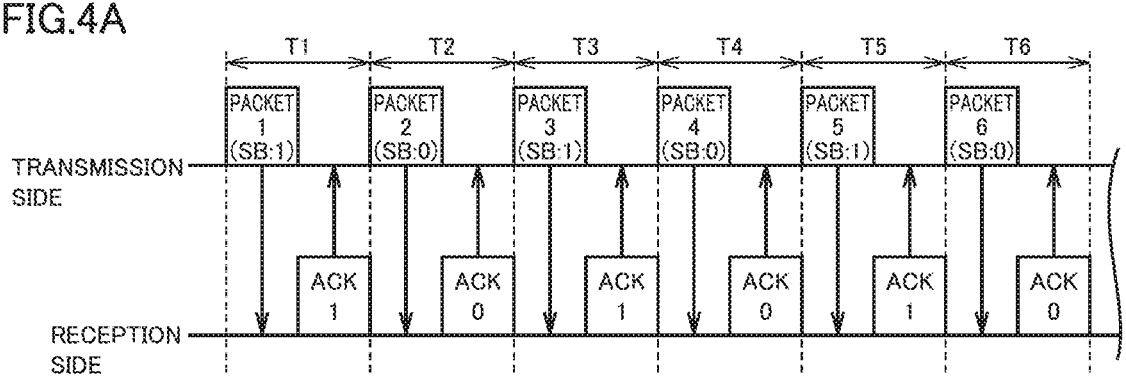
FIGS. 4A to 4C show exemplary illustrative non-limiting drawings illustrating sequences of retransmission processing involved with synchronous communication in the information processing system according to the present embodiment.

FIG. 4A shows a sequence involved with synchronous communication when data is not lost. Referring to FIG. 4A, in a period T1, the transmission side transmits a packet 1 to the reception side. The packet transmitted from the transmission side to the reception side contains in its header portion or the like, sequence information as information for identifying a packet.

Under the Bluetooth® scheme, a sequence bit (SB) of one bit is allocated as the sequence information, and synchronous communication and loss of a packet are sensed by varying a value for the sequence bit at any time. The sequence bit represents sequence information of which value is varied in accordance with prescribed rules each time a packet is transmitted or received, and is contained in a packet transmitted from radio communication unit 120. The sequence information is varied each time synchronous communication is performed. Whether or not a packet has been lost is determined based on the sequence information.

For example, it is assumed that "1" is provided to packet 1 as the sequence information (the sequence bit being on). When packet 1 from the transmission side reaches the reception side, the reception side returns acknowledge (ACK). ACK contains "1" as the sequence information corresponding to received packet 1. When ACK reaches the transmission side, the transmission side may confirm reception of previously transmitted packet 1 by the reception side and hence it transmits a packet 2 different from packet 1 to the reception side in a next period T2. Here, "0" (the sequence bit being off) is provided as the sequence information.

Thereafter, similarly, transmission of a packet from the transmission side to the reception side and transmission of ACK indicating reception of the packet from the reception side to the transmission side are repeated. Here, the same sequence information is provided to the same packet, and sequence information updated in accordance with prescribed rules is provided to a different packet. In the description above, one bit is allocated as a sequence bit, and in this case, substantially "0" and "1" are alternately provided as two values of "0" and "1" are successively incremented. When more bits can be allocated, values are successively incremented within a range of values which can be held by the allocated bits.

Figure 4B:
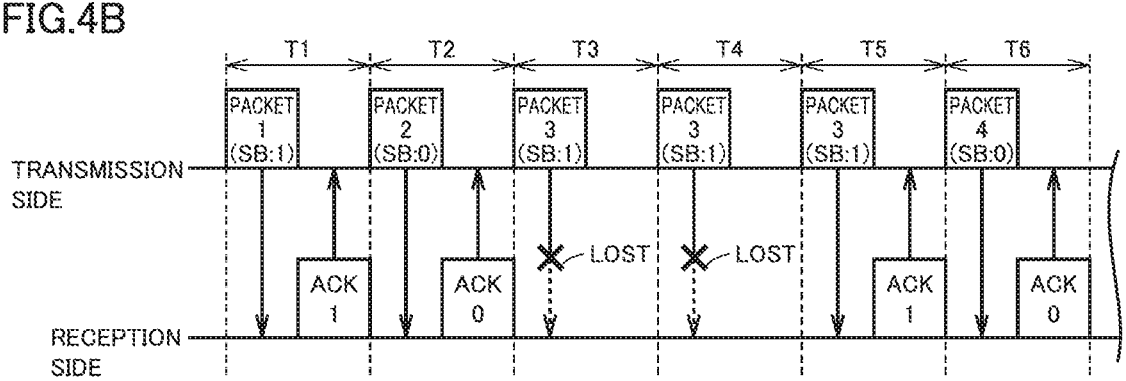
Figure 4C:
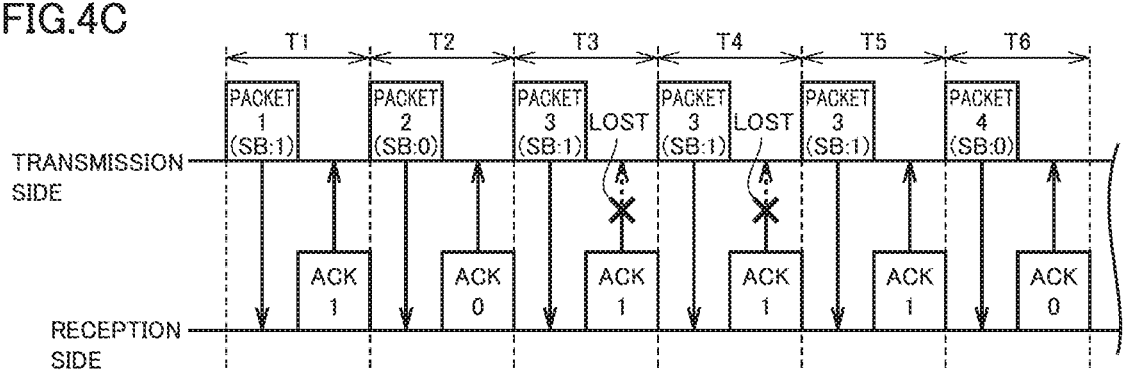

Though FIGS. 4A to 4C show one information processing apparatus as the transmission side and the other information processing apparatus as the reception side for the sake of convenience of description, basically, data is bidirectionally transmitted and received and hence any information processing apparatus can be the reception side and the transmission side. The reception side and the transmission side shown in FIGS. 4A to 4C merely represent roles in one aspect and they do not relate to the master and the slave under the Bluetooth® scheme. Any of the reception side and the transmission side can function as the master.

For example, in an example in which the reception side functions as the master and the transmission side functions as the slave, communication is performed in a procedure as below:

(1) Polling from the master (not shown in FIG. 4A);

(2) Transmission of packet 1 by the slave immediately after polling (sequence information here being set to "1");

(3) Polling again by the master (this polling also functioning as ACK) after lapse of a prescribed interval (a sniff interval) (sequence information here being set to "1"); and (4) Transmission of packet 1 by the slave immediately after polling (sequence information here being set to "0").

The similar procedure is repeated thereafter.

Resending processing performed when transmitted data is lost will now be described.

FIG. 4B shows a sequence involved with retransmission processing when a packet from the transmission side is lost. Referring to FIG. 4B, it is assumed that, in period T1 and a period T2, transmission of packet 1 and packet 2 from the transmission side to the reception side is successful, however, in a period T3, transmission of a packet 3 from the transmission side to the reception side fails. In a process of transmission of packet 3 from the transmission side to the reception side, packet 3 is lost.

In this case, since the reception side is unable to receive the packet, it is unable to return ACK although it substantially returns ACK. When the reception side functions as the master, it is unable to transmit ACK. When the reception side functions as the slave, it is unable to increment sequence information although it is able to return ACK, and therefore ACK is not valid, which is substantially equivalent to response with NACK.

Since the transmission side is unable to receive ACK of packet 3 within period T3 or is unable to receive valid ACK, it determines that reception by the reception side of previously transmitted packet 3 is not confirmed, and in a next period T4, the transmission side resends packet 3 the same as previously transmitted packet 3 to the reception side. Sequence information provided to resent packet 3 is the same as the sequence information (that is, "1") provided to the previously transmitted packet. In the example shown in FIG. 4B, packet 3 is lost also in period T4, and consequently, packet 3 is transmitted from the transmission side to the reception side also in a period T5. FIG. 4B shows an example in which retransmission processing is performed twice. Sequence information provided to the packet transmitted in the retransmission processing is not changed so long as the transmitted packet is the same.

FIG. 4C shows a sequence involved with retransmission processing when ACK from the reception side is lost. Referring to FIG. 4C, it is assumed that, though transmission of packet 1 to packet 3 from the transmission side to the reception side is successful in period T1 to period T3, transmission of ACK from the reception side to the transmission side fails in period T3. Though packet 3 is transmitted from the transmission side to the reception side, ACK of reception of packet 3 is lost.

In this case as well, as in the example described above, since the transmission side does not receive ACK of packet 3 within period T3, the transmission side determines that reception of previously transmitted packet 3 by the reception side is not confirmed and resends packet 3 the same as previously transmitted packet 3 to the reception side in next period T4. Sequence information provided to resent packet 3 is the same as the sequence information (that is "1") provided to the previously transmitted packet. As in the example shown in FIG. 4B, FIG. 4C also shows an example in which ACK is lost also in period T4, and consequently, packet 3 is transmitted from the transmission side to the reception side also in period T5.

As shown in FIGS. 4B and 4C, when a packet from the transmission side or ACK from the reception side continues to be lost, a next packet cannot be transmitted. Therefore, in general, the upper limit number of times of repetition of retransmission processing is set in advance, and when the number of times of performed retransmission processing reaches the upper limit number of times or a time period required for retransmission processing reaches the upper limit time period, processing for resending a packet may be stopped and a next packet may be transmitted. Such an upper limit number of times or an upper limit time period may also be referred to as a set number of times or a set time for timeout. In this case, a packet which cannot be transmitted may be retransmitted after lapse of a prescribed period of time.

As the retransmission processing as shown in FIGS. 4B and 4C is performed, reliable transmission of a packet from the transmission side to the reception side is ensured, however, delay may be caused in accordance with a time period required for the retransmission processing. For example, when data is not lost as shown in FIG. 4A, the reception side receives packet 3 in period T3. In contrast, as shown in FIG. 4B or 4C, as a result of data loss and the retransmission processing, it is in period T5 that the reception side receives packet 3. A packet 4 transmitted thereafter and subsequent packets are also delayed accordingly.

Depending on a type of data contained in each packet, latest data may be required rather than data being transmitted with such delay. There may be a situation requiring processing for obtaining and transmitting new data without performing retransmission processing even though a packet is lost or ACK of a packet is lost. In this case, a packet of which transmission has failed is discarded as it is.

Figure 5:
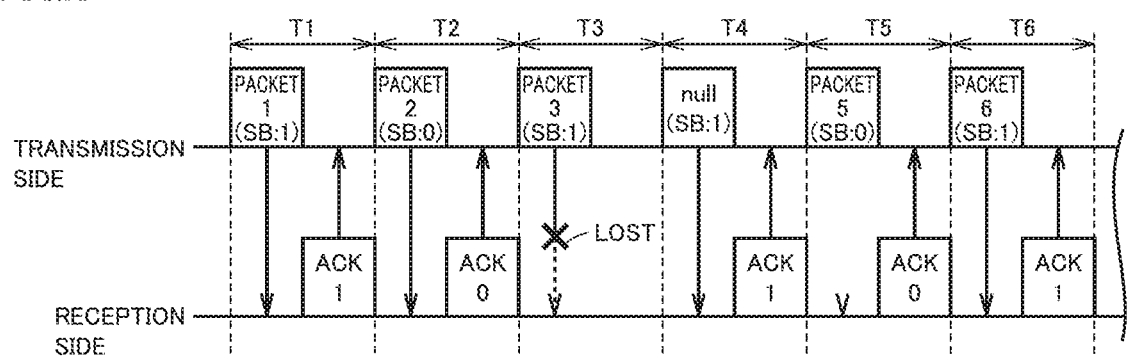
FIG. 5 shows an exemplary illustrative non-limiting drawing illustrating a sequence when a timeout in the retransmission processing shown in FIGS. 4A to 4C is set to zero.

In a method in which retransmission processing is not performed, the set number of times or the set time in connection with timeout can also be set to zero. FIG. 5 shows one example of a sequence when setting for a timeout in the retransmission processing shown in FIGS. 4A to 4C is set to zero.

Referring to FIG. 5, it is assumed that, though transmission of packet 1 and packet 2 from the transmission side to the reception side is successful in period T1 and period T2, transmission of packet 3 from the transmission side to the reception side fails in period T3. Packet 3 is lost in a process of transmission of packet 3 from the transmission side to the reception side.

In this case, since the reception side is unable to receive a packet, it is also unable to return ACK. Since the transmission side does not receive ACK of packet 3 within period T3, the transmission side determines that reception of previously transmitted packet 3 by the reception side is not confirmed and stops retransmission processing. In next period T4, an empty packet (a null packet) is transmitted to the reception side so that a new packet can be transmitted. Though original packet 4 is passed to a downstream layer from a layer (for example, an application layer) upstream of a communication layer through which the null packet is transmitted, such a flow conflicts with transmission of the null packet through the communication layer and packet 4 passed from the upstream layer cannot be transmitted. Thus, in next period T5, a packet 5 after next is transmitted instead of packet 4 which should follow packet 3. When packet 3 is lost, packet 4 which follows packet 3 cannot be transmitted and packet 4 is also substantially lost. If it is assumed that processing for transmitting a null packet through the communication layer is not performed, in period T4 in FIG. 5, packet 4 is transmitted to the reception side instead of the null packet.

Sequence information provided to the transmitted null packet is set to "1" similarly to the sequence information provided to the previously transmitted packet.

The information processing apparatus constituting information processing system 1 according to the present embodiment is configured to be able to select an operation mode in which retransmission processing is not performed. Such processing is referred to as "non-retransmission processing" below.

"Non-retransmission processing" herein encompasses processing for transmitting, even when a transmitted packet is lost or ACK of the transmitted packet is lost, another packet without resending the packet. Selection between retransmission processing and non-retransmission processing can arbitrarily be made without changing a sequence in synchronous processing shown in FIGS. 4A to 4C and in retransmission processing adopted in the synchronous processing.

Figure 6A:
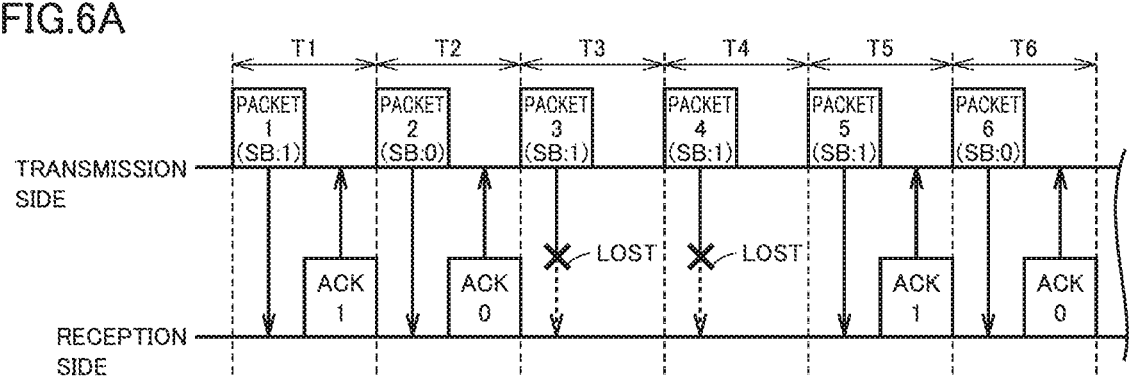
FIGS. 6A and 6B show exemplary illustrative non-limiting drawings illustrating sequences in non-retransmission processing involved with synchronous communication in the information processing system according to the present embodiment.
Figure 6B:
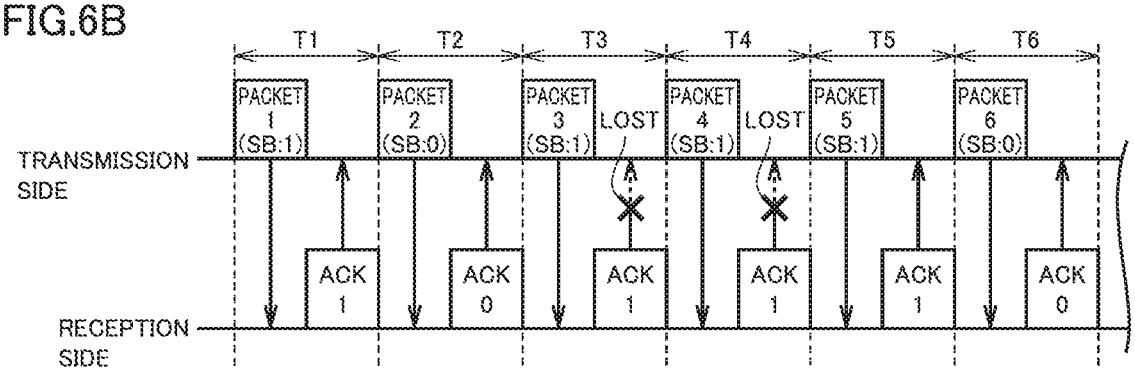

Non-retransmission processing according to the present embodiment will be described below. FIGS. 6A and 6B show examples of a sequence in the non-retransmission processing involved with synchronous communication in information processing system 1 according to the present embodiment.

FIG. 6A shows an example in which transmission of packet 1 and packet 2 from the transmission side to the reception side is successful in period T1 and period T2, whereas transmission of packet 3 from the transmission side to the reception side fails in period T3 as in FIG. 4B described above.

In the non-retransmission processing, in next period T4, new packet 4 is transmitted from the transmission side to the reception side without resending packet 3 of which transmission fails. From a point of view of the reception side, though the reception side receives packet 2 (sequence information being "0") in period T2, the reception side does not receive a packet provided with next sequence information "1" in period T3, and hence the reception side waits for arrival of a packet provided with "1" as sequence information.

When the transmission side transmits packet 4 provided with "0" as sequence information to the reception side, the reception side receives a packet provided with sequence information different from expected sequence information and may not be able to appropriately process the received packet.

In information processing system 1 according to the present embodiment, a packet transmitted after failure in transmission of one packet contains data independently of data contained in a previously transmitted packet, whereas a newly transmitted packet is provided with sequence information used in normal retransmission processing. Since the reception side can determine that a packet is resent in accordance with normal retransmission processing, the reception side performs processing similar to the normal retransmission processing.

In the example shown in FIG. 6A, since both of packets transmitted from the transmission side are lost in period T3 and period T4, sequence information is not updated in accordance with a procedure in normal retransmission processing but it is maintained as it is. Data different from packet 2 is stored in packet 3 and packet 4 transmitted in period T3 and period T4, respectively.

FIG. 6B shows an example in which transmission of packet 1 to packet 3 from the transmission side to the reception side is successful in period T1 to period T3, however, transmission of ACK from the reception side to the transmission side fails in period T3 as in FIG. 4C described above. Since the transmission side is unable to confirm reception of packet 3 by the reception side, the transmission side performs retransmission processing as shown in FIG. 4C or non-retransmission processing as in FIG. 6A. In next period T4, the transmission side transmits packet 4 containing data different from data contained in previously transmitted packet 3 to the reception side. Sequence information provided to packet 4 is not updated but sequence information the same as sequence information provided to packet 3 is provided.

In FIG. 6B, transmission of a packet from the transmission side to the reception side fails also in period T4. Therefore, similarly also in subsequent period T5, the transmission side transmits packet 5 containing data different from data contained in previously transmitted packet 4 to the reception side. Sequence information provided to packet 5 is not updated but sequence information the same as the sequence information provided to packet 3 is provided.

As shown in FIGS. 6A and 6B, when a transmitted packet is lost or ACK of the transmitted packet is lost, a value for sequence information is determined in accordance with a logic as in retransmission processing, whereas data stored in each packet is different (typically, latest data).

As shown in FIGS. 4A to 4C and FIGS. 6A and 6B, in any of retransmission processing and non-retransmission processing according to the present embodiment, a method of updating a sequence bit (sequence information) is common, and the sequence bit is updated to a value in accordance with acknowledge (ACK) in each case. In non-retransmission processing, data itself stored in a packet is different from data itself stored in a previously transmitted packet. Radio communication unit 120 provides a sequence bit (sequence information) of which value is varied in accordance with prescribed rules to a packet to be transmitted, in any of retransmission processing and non-retransmission processing.

By adopting non-retransmission processing and selective processing between retransmission processing and non-retransmission processing, the transmission side can switch as appropriate between retransmission processing and non-retransmission processing without mounting a new sequence for reception processing on the reception side. For example, when processing proceeds while radio communication between the processing main body and the operation controller is established, communication suited for an application can be realized by making selection between retransmission processing for resending in next or later communication, a packet lost due to temporary disturbance or the like in a communication environment and non-retransmission processing in which such resending is not performed. A more flexible form of transmission in accordance with a content of transmitted data can be realized.

[C. Packet Format]

Figure 7:
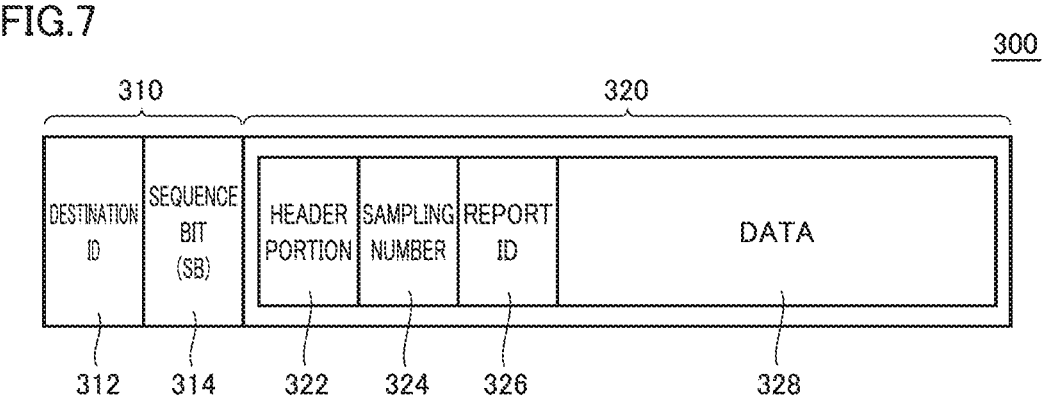
FIG. 7 shows an exemplary illustrative non-limiting drawing illustrating one example of a format of a packet transmitted and received in the information processing system according to the present embodiment.

One example of a format of a packet transmitted and received in information processing system 1 according to the present embodiment will now be described with reference to FIG. 7.

A format 300 of a packet includes a packet header portion 310 and a user data portion 320. Format 300 shown in FIG. 7 is by way of example and may also contain any data other than the portion shown in FIG. 7.

Packet header portion 310 includes a destination ID portion 312 for storing identification information (an address specific to hardware or the like) for specifying a destination information processing apparatus and a sequence bit 314 for storing sequence information for identifying each packet described in FIGS. 4A to 4C and FIGS. 6A and 6B.

User data portion 320 is a substantial part of data stored and transmitted in a packet and any data structure can be adopted therefor. By way of example, format 300 shown in FIG. 7 includes a data header portion 322, a sampling number portion 324, a report ID portion 326, and a data main body portion 328.

Data header portion 322 stores identification information specifying an application which creates or uses each packet.

Sampling number portion 324 stores a sampling number as identification information for identifying data main body portion 328. The sampling number is sequence information provided to allow data main body portion 328 to be specified, which is different from sequence information (a sequence bit) provided to a packet itself. Typically, the sampling number is incremented as a content of data main body portion 328 is successively created. A transmitted packet contains a sampling number as different sequence information of which value is incremented each time data to be transmitted is generated. Alternatively, the sampling number is incremented as packets are successively transmitted. A transmitted packet contains a sampling number as different sequence information of which value is incremented each time data is transmitted.

The sampling number may be used for sensing an order of generation of data transmitted from the transmission side or for sensing missing of data due to a missing sampling number in an application on the reception side. Since such applications are assumed, a range of sampling numbers unique (without redundant numbers) to a prescribed processing period is employed. A sampling number representing different sequence information is preferably longer in data length than a sequence bit representing sequence information for a packet. As described above, for example, one bit is allocated as a sequence bit, whereas approximately 12 to 32 bits may be allocated as a sampling number.

Thus, a sequence bit representing sequence information for a packet is used for determining whether or not an individual packet has reached the destination, whereas a sampling number representing different sequence information is used for determining whether or not all of data necessary in the application at the destination have been received. The sequence bit representing sequence information for a packet is used for determining whether or not a transmitted packet is lost in a physical layer and a data link layer, whereas a sampling number representing different sequence information is used for determining whether or not a packet has arrived through an application layer.

Report ID portion 326 stores a report ID which is information for specifying a content of data stored in user data portion 320. The reception side specifies a type of data contained in user data portion 320 based on a value for a report ID stored in report ID portion 326. One example of a report ID will be described with reference to FIG. 8.

A report ID list 160 defines each report ID brought in correspondence with a type of data stored in a packet.

In report ID list 160, a value for a report ID unique to each report ID column 162 is defined, and a type and arrangement of data stored in user data portion 320 are defined in correspondence with each report ID. Information on a type and arrangement of data is defined in a type column 164.

For example, a report ID "1" means that an "operation 1 onto operation portion 102," an "operation 2 onto operation portion 102," a "value sensed by acceleration sensor 130," and a "value sensed by gyro sensor 132" are stored in data main body portion 328. In general, the same report ID list 160 shown in FIG. 8 is shared by the transmission side and the reception side, and the reception side which receives some kind of packet from the transmission side switches processing for a data column stored in data main body portion 328 based on a value for a report ID contained in the received packet.

Report ID list 160 may define information indicating whether or not to perform retransmission processing for each report ID. Determination may be made with reference to a resent column 166 in report ID list 160 that a packet provided with a report ID for which "1" is set is subjected to retransmission processing, whereas a packet provided with a report ID for which "0" is set is not subjected to retransmission processing (non-retransmission processing is selected).

[D. Functional Configuration]

A functional configuration of information processing apparatus 100 (operation terminal) according to the present embodiment will now be described with reference to FIG. 9. Each component shown in FIG. 9 may be implemented by execution of control program 118 (FIG. 2) and an application program by CPU 112 (FIG. 2) or by a processor or a hardwired circuit constituting radio communication unit 120 (FIG. 2). So long as a function as described below can be implemented, the component may be mounted by using any hardware and software.

Figure 9:
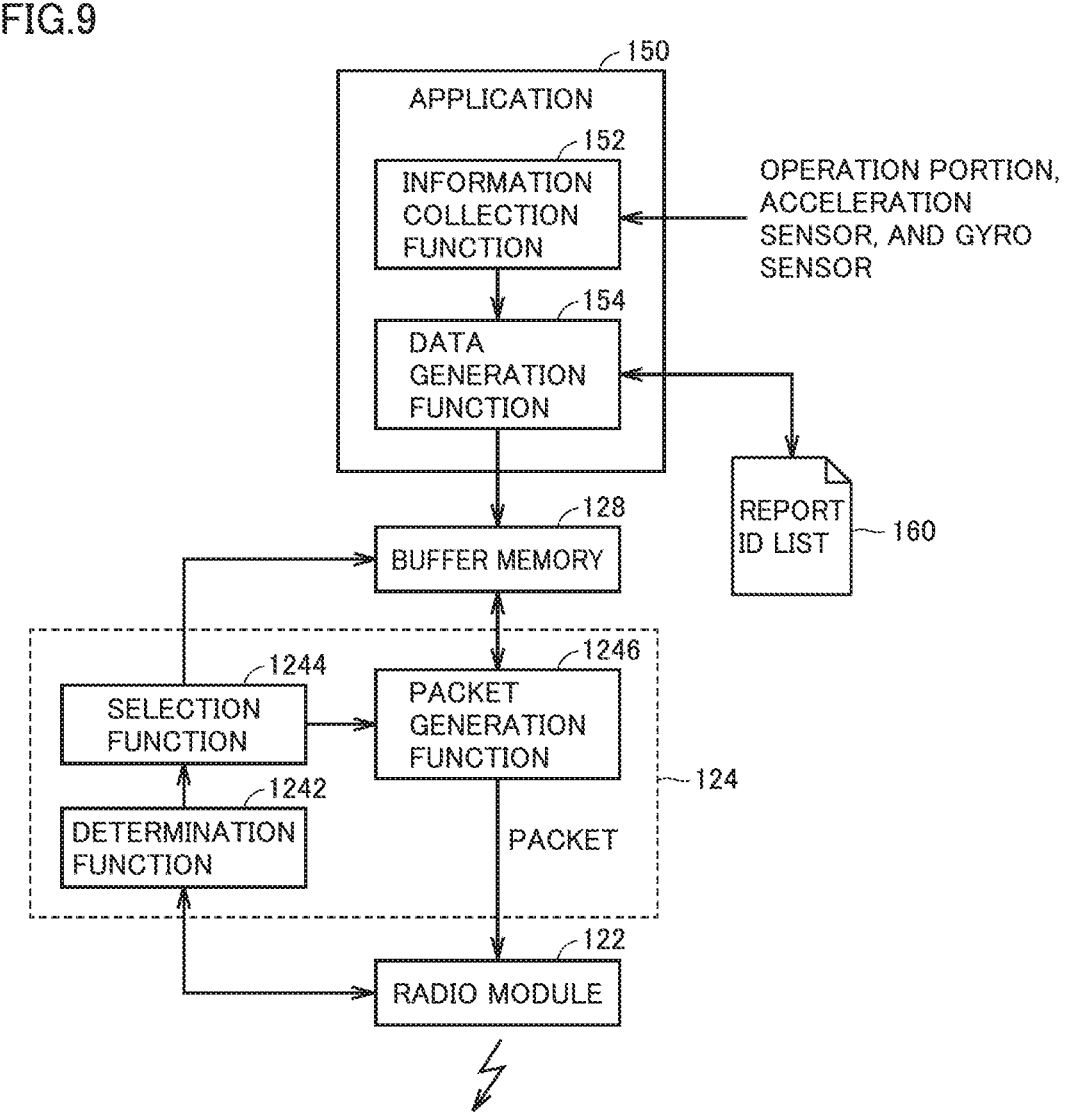
FIG. 9 shows an exemplary illustrative non-limiting drawing illustrating one example of a functional configuration of the information processing apparatus (operation terminal) shown in FIG. 1.

Referring to FIG. 9, information processing apparatus 100 includes as its functional configurations, an application 150 including an information collection function 152 and a data generation function 154 and radio controller 124 (see FIG. 2) including a determination function 1242, a selection function 1244, and a packet generation function 1246.

Information collection function 152 of application 150 collects as appropriate information representing an operation input by a user onto operation portion 102 and a result of sensing by acceleration sensor 130 and gyro sensor 132. Data generation function 154 generates data (data stored in data main body portion 328) by combining as appropriate collected information in accordance with a condition of execution of the application. Data generation function 154 has report ID portion 326 (see FIG. 7) store a report ID indicating a type of generated data by referring to report ID list 160. Data generation function 154 increments a sampling number each time it generates data, and has sampling number portion 324 (see FIG. 7) store the incremented sampling number.

Data generated in application 150 is once stored in buffer memory 128. In principle, data stored earlier in buffer memory 128 is sequentially output to radio controller 124.

Determination function 1242 of radio controller 124 determines whether or not a packet transmitted from radio communication unit 120 has been received by another information processing apparatus. Determination function 1242 determines whether or not a packet transmitted from radio communication unit 120 has been received by another information processing apparatus based on a value for a sequence bit (sequence information) contained in a packet. Determination function 1242 determines whether or not a packet is lost during synchronous communication by radio communication unit 120. More specifically, determination function 1242 determines whether or not the reception side has received a packet based on whether or not ACK of a packet transmitted from the transmission side to the reception side has been received and outputs a result of determination to selection function 1244.

Selection function 1244 selects between retransmission processing for retransmitting the previously transmitted packet and non-retransmission processing for transmitting another packet instead of the previously transmitted packet depending on a content of the previously transmitted packet when determination function 1242 is unable to confirm reception of the previously transmitted packet by another information processing apparatus. More specifically, selection function 1244 determines whether or not processing for resending each packet is necessary based on a type of each packet (a designated report ID), and selects whether to perform retransmission processing or non-retransmission processing for the lost packet when the transmitted packet is lost based on a result of determination by determination function 1242. Selection function 1244 selectively performs processing for having packet generation function 1246 generate a packet the same as the previously transmitted packet or erasing an entry corresponding to the previously transmitted packet stored in buffer memory 128 and having packet generation function 1246 generate a packet based on a next entry in buffer memory 128, in accordance with a result of selection.

Buffer memory 128 stores data to be contained in one or more packets to be transmitted. Though data corresponding to a previously transmitted packet stored in buffer memory 128 is removed when acknowledge (ACK) containing correct sequence information is received from the reception side, in non-retransmission processing, it is removed independently of a content of acknowledge (ACK), that is, the sequence information.

Thus, selection can be made between retransmission processing for resending a packet determined to have been lost when determination function 1242 determines that a packet is lost and non-retransmission processing for transmitting a newer packet without resending a packet determined to have been lost even though determination function 1242 determines that a packet is lost. Selection function 1244 determines whether to transmit a packet in retransmission processing or non-retransmission processing in accordance with a content of a packet to be transmitted from radio communication unit 120.

Switching between retransmission processing and non-retransmission processing as described above is made with such a functional configuration.

[E. Processing Procedure]

Figure 10:
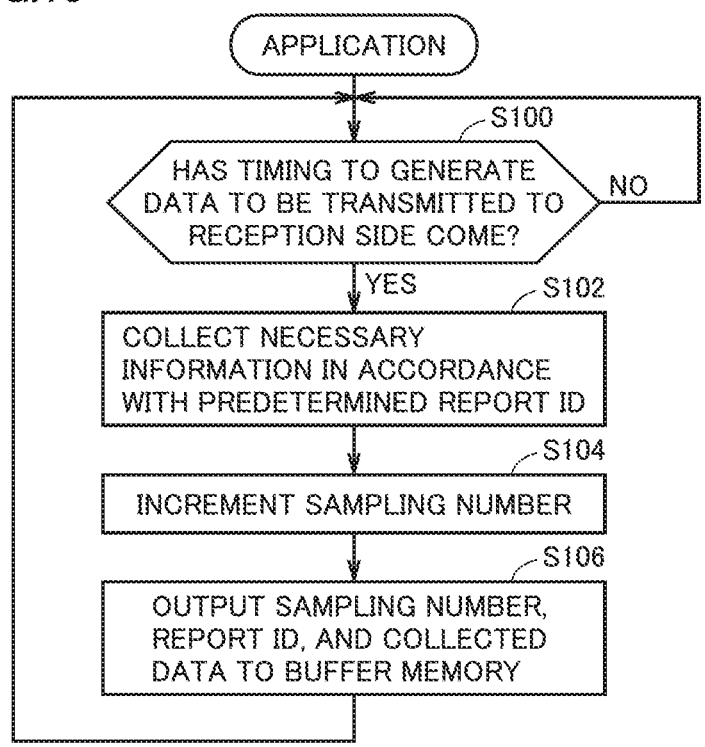
FIG. 10 shows an exemplary illustrative non-limiting flowchart illustrating one example of a processing procedure in the information processing apparatus (operation terminal) shown in FIG. 1.
Figure 11:
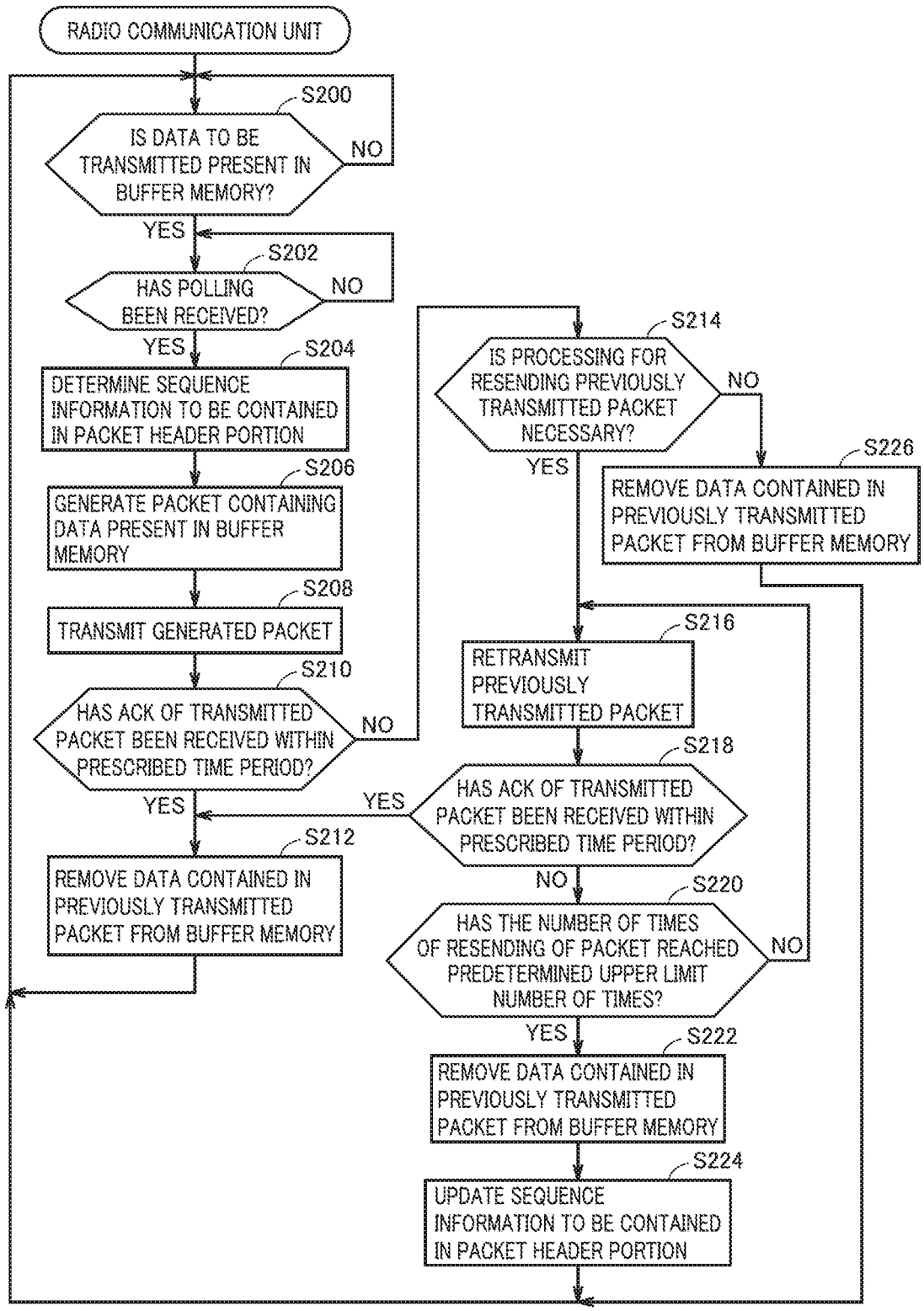
FIG. 11 shows an exemplary illustrative non-limiting flowchart illustrating one example of a processing procedure in the information processing apparatus (operation terminal) shown in FIG. 1.

A processing procedure in information processing apparatus 100 (operation terminal) according to the present embodiment will now be described with reference to FIGS. 10 and 11. FIG. 10 shows a processing procedure in application 150 and FIG. 11 shows a processing procedure in radio communication unit 120. Each step shown in FIG. 10 is typically implemented by execution of control program 118 and an application program by CPU 112 (FIG. 2). Each step shown in FIG. 11 may be implemented by coordination between radio communication unit 120 and CPU 112.

Referring to FIG. 10, CPU 112 determines whether or not timing to generate data to be transmitted to the reception side has come based on a state of execution of an application program (step S100). When timing to generate data to be transmitted to the reception side has not yet come (NO in step S100), processing in step S100 is repeated.

When timing to generate data to be transmitted to the reception side has come (YES in step S100), CPU 112 collects necessary information from operation portion 102, acceleration sensor 130, and gyro sensor 132 in accordance with a predetermined report ID (step S102) and increments a sampling number (step S104). Then, CPU 112 outputs the sampling number, the report ID, and the collected data to buffer memory 128 as data to be stored in a packet (step S106). Then, processing in step S100 or later is repeated.

Referring to FIG. 11, radio communication unit 120 determines whether or not data to be transmitted is present in buffer memory 128. When data to be transmitted is not present in buffer memory 128 (NO in step S200), processing in step S200 is repeated.

When data to be transmitted is present in buffer memory 128 (YES in step S200), radio communication unit 120 determines whether or not it has received polling from information processing apparatus 200 (processing main body) (S202). When the radio communication unit has not received polling from information processing apparatus 200 (NO in step S202), processing in step S202 is repeated.

When radio communication unit 120 has received polling from information processing apparatus 200 (YES in step S202), radio communication unit 120 determines sequence information to be contained in packet header portion 310 (see FIG. 7) (step S204), generates a packet containing data present in buffer memory 128 as user data portion 320 (step S206), and transmits the generated packet (step S208).

Then, radio communication unit 120 determines whether or not it has received acknowledge (ACK) of the transmitted packet within a prescribed period of time (step S210). When radio communication unit 120 has received acknowledge (ACK) of the packet within a prescribed period of time (YES in step S210), radio communication unit 120 removes data contained in the previously transmitted packet from buffer memory 128 (step S212) and repeats processing in step S200 or later.

When radio communication unit 120 has not received acknowledge (ACK) of the transmitted packet (NO in step S210), radio communication unit 120 determines whether or not processing for resending the previously transmitted packet is necessary (step S214).

When processing for resending the previously transmitted packet is necessary (YES in step S214), retransmission processing is performed a prescribed number of times. Radio communication unit 120 retransmits the previously transmitted packet (step S216) and determines whether or not it has received acknowledge (ACK) of the transmitted packet within a prescribed period of time (step S218). When the radio communication unit has received acknowledge (ACK) of the transmitted packet within a prescribed period of time (YES in step S218), processing in step S212 or later is performed.

When radio communication unit 120 has not received acknowledge (ACK) of the transmitted packet within a prescribed period of time (NO in step S218), radio communication unit 120 determines whether or not the number of times of retransmission of the previously transmitted packet has reached a predetermined upper limit number of times (step S220). When the number of times of retransmission of the previously transmitted packet has not reached the predetermined upper limit number of times (NO in step S220), processing in step S216 is performed again.

When the number of times of retransmission of the previously transmitted packet has reached the predetermined upper limit number of times (YES in step S220), radio communication unit 120 stops processing for resending the previously transmitted packet and removes data contained in the previously transmitted packet from buffer memory 128 (step S222), updates sequence information to be contained in packet header portion 310 (see FIG. 7) (step S224), and repeats processing in step S200 or later.

When processing for resending the previously transmitted packet is not necessary (NO in step S214), that packet is subjected to non-retransmission processing. Radio communication unit 120 removes data contained in the previously transmitted packet from buffer memory 128 (step S226) and repeats processing in step S200 or later while it maintains sequence information contained in packet header portion 310 (see FIG. 7). In this case, in processing in step S200 or later, a new packet containing different data while it has sequence information the same as in the previously transmitted packet is transmitted.

In steps S210, S212, S214, and S226 shown in FIG. 11, more specifically, in retransmission processing, when reception of ACK within a period during which data set in advance is held (flush timeout) is confirmed, data is removed from the buffer memory, and when reception of ACK is not confirmed, the same data is transmitted any number of times each time polling is received until the flush timeout. When the flush timeout comes, data is removed from the buffer memory even though ACK is not received. The flush timeout may be set to infinity. In non-retransmission processing, the flush timeout is set substantially to zero and data is immediately removed from the buffer memory.

Though radio controller 124 transmits data upon receiving polling from information processing apparatus 200 (processing main body), this polling includes ACK. ACK of a packet transmitted every prescribed period is transmitted over polling in a next period. In retransmission processing, two transmission packets are prepared in advance, and when reception of ACK is confirmed, a new packet is transmitted and an old packet is discarded. When reception of ACK is not confirmed, an old packet is transmitted.

[F. Data Contained in Packet]

As described above, in information processing system 1 according to the present embodiment, in any of retransmission processing and non-retransmission processing, a value for sequence information (sequence bit) provided to a packet is determined in accordance with the same rules. Therefore, the reception side is unable to determine whether or not a packet the same as the previously transmitted packet has been transmitted in retransmission processing or whether or not a packet different from the previously transmitted packet has been transmitted in non-retransmission processing only based on information on a sequence bit. Therefore, information for identifying in which of retransmission processing and non-retransmission processing a packet has been transmitted may be contained in user data portion 320 (FIG. 7) of a packet transmitted from the transmission side. A packet transmitted from radio communication unit 120 may contain information representing whether or not a packet transmitted from radio communication unit 120 has been transmitted in accordance with retransmission processing or non-retransmission processing.

Since a value for sequence information (sequence bit) provided to a packet is determined in accordance with the same rules in information processing system 1 according to the present embodiment, the reception side can also adopt an information processing apparatus which supports only retransmission processing. The reception side, however, may be able to provide a more flexible service by switching processing in an application for each of retransmission processing and non-retransmission processing. Therefore, the reception side may preferably know in advance whether or not the transmission side can selectively perform retransmission processing and non-retransmission processing.

The reception side preferably can have information indicating that the information processing apparatus on the transmission side has an ability of non-retransmission processing. For example, specifically, such information may be contained in user data portion 320 of a packet transmitted from radio communication unit 120 or transmitted in a special packet prepared separately from a normal packet.

[G. Prohibition of Non-Resending Processing]

Since a lost packet is not transmitted to the reception side in non-retransmission processing as described above, non-retransmission processing may not be preferred depending on a type of data contained in a packet. In such a case, non-retransmission processing may be prohibited. An example of prohibition of non-retransmission processing will be described below.

(g1: Calibration Data)

A packet transmitted from an information processing apparatus as an operation controller may contain information representing an operation input by a user onto operation portion 102 and a result of sensing by acceleration sensor 130 and gyro sensor 132. As shown in FIG. 7, the packet may contain information representing a content of an operation input by a user onto operation portion 102 and information representing a result of sensing by acceleration sensor 130 and gyro sensor 132 (a sensing unit). In many cases, such data is required to be real-time data and past data is not much necessary. Therefore, even though a transmitted packet is lost, it does not have to be resent in many cases. In such a case, these packets are successively transmitted from the transmission side to the reception side in accordance with non-retransmission processing.

On the other hand, there is also data of which transmission from the transmission side to the reception side must be ensured. Non-retransmission processing of such data may be prohibited and only retransmission processing thereof may be permitted.

For example, operation portion 102 may be calibrated such that information representing an operation input by the user onto operation portion 102 is as intended by the user. Similarly, the sensing unit (acceleration sensor 130 and gyro sensor 132) for sensing an attitude and a motion of information processing apparatus 100 in response to an operation of information processing apparatus 100 from the user may also be calibrated such that a sensing value as intended by the user is output.

Non-retransmission processing of data used for such calibration may be prohibited such that the data is reliably transmitted. Non-retransmission processing of a packet containing information on calibration of at least one of operation portion 102 and the sensing unit (acceleration sensor 130 and gyro sensor 132) may be prohibited.

Such prohibition of non-retransmission processing should only be defined such that processing for retransmission a report ID allocated to a packet used for calibration in report ID list 160 shown in FIG. 8 is performed. Alternatively, data used for calibration may be stored in a special packet, the special packet may be transmitted, and non-retransmission processing of the special packet may be prohibited.

(g2: Update Data)

For example, data should reliably be transmitted from the transmission side to the reception side also when a program or firmware executed in an information processing apparatus is updated (upgraded). In such a case as well, non-retransmission processing is preferably prohibited.

More specifically, for example, updating processing for transmitting firmware from information processing apparatus 200 (processing main body) shown in FIG. 1 to information processing apparatus 100 (operation controller) may be performed. In such a case, retransmission processing is prohibited. Information processing apparatus 200 (processing main body) has a storage which temporarily holds a program (firmware) to be installed in information processing apparatus 100 (operation controller) and data read from the storage is transmitted to information processing apparatus 100. In this case, non-retransmission processing of a packet containing the entirety or a part of the program to be installed in information processing apparatus 100 is prohibited in information processing apparatus 200. A packet containing information on update of a program (typically, firmware) executed by information processing apparatus 100 is transmitted in retransmission processing.

By thus prohibiting non-retransmission processing, non-retransmission processing of data involved with an operation of an apparatus such as update of a program is prohibited and the data is transmitted in retransmission processing so that the data can reliably be transmitted from the transmission side to the reception side.

[H. One Example of Processing for Compensating for Transmission Data]

When data is transmitted in non-retransmission processing as described above, change which has occurred while the packet is lost is not transmitted to the reception side. For example, an example in which a content of an operation input by a user onto the operation portion is transmitted is assumed. For example, such a situation that the user presses a push button, however, information on pressing is not transmitted to the processing main body and no reaction occurs may take place. Such a state may lower operability of a user. Therefore, depending on an application, though non-retransmission processing is performed, processing for enhancing operability by reflecting information generated during a period in which a packet is lost on data transmitted in non-retransmission processing may be adopted. One example of such processing for compensating for transmission data will be described below with reference to FIGS. 12A and 12B.

For example, an example in which a content of an operation input by a user onto the operation portion such as a push button is contained in a packet and the packet is transmitted is assumed.

In each period T, an immediately preceding status value for the operation portion (ON (true: "1") if it is pressed, and otherwise OFF (false: "0")) is stored in a user data portion of a packet and the packet is transmitted to the reception side. The reception side updates a variable therein based on the status value contained in the received packet.

Figure 12A:
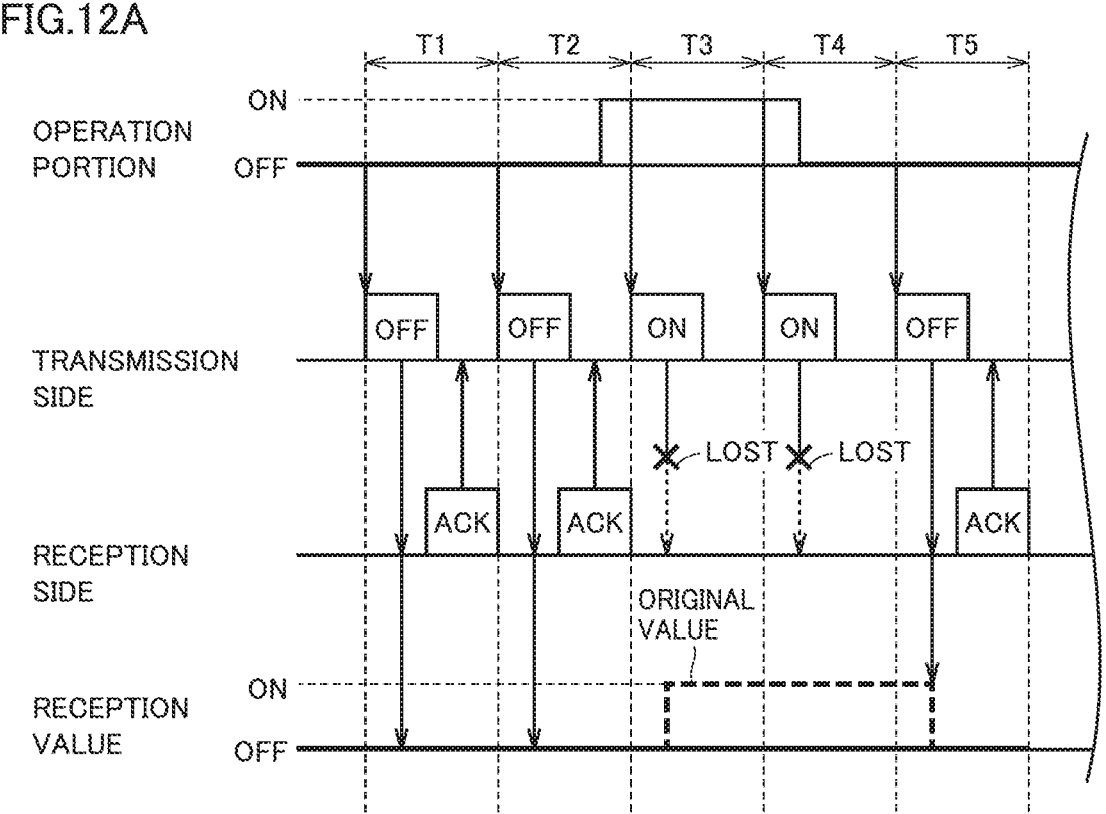
FIGS. 12A and 12B show exemplary illustrative non-limiting drawings illustrating examples of processing for compensating for transmission data in the information processing system according to the present embodiment.

Referring to FIG. 12A, it is assumed that, in period T1 and period T2, transmission of packets from the transmission side to the reception side is successful, whereas in period T3 and period T4, transmission of packets from the transmission side to the reception side fails. An operation input by the user onto the operation portion is performed from some time point in period T2 to some time point in period T4.

In this case, packets transmitted in period T3 and period T4 store "ON" as a content of the operation input by the user. When these packets are appropriately received, a reception value must be changed from "OFF" to "ON" owing to the packet received in period T3, and a reception value must be changed from "ON" to "OFF" owing to the packet received in period T5. Since these packets are not appropriately received, the reception value on the reception side is maintained "OFF". In spite of the operation of the operation portion by the user, that operation is not detected on the reception side (the processing main body) and operational feeling of the user may lower.

Such lowering in operational feeling of the user is highly likely to be unnoticeable if a period of transmission is sufficiently short. When a period of transmission cannot be shortened due to restrictions on a system, however, compensation processing as shown in FIG. 12B may be applied.

Figure 12B:
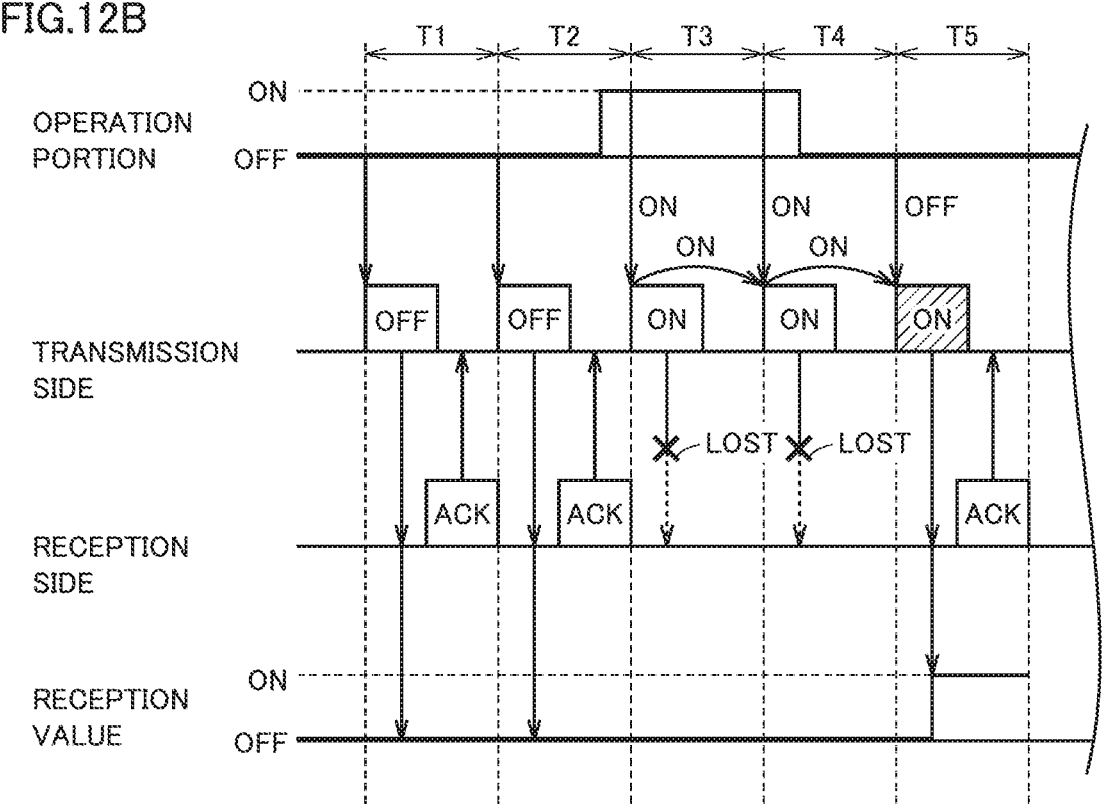

Referring to FIG. 12B, the transmission side can sense in period T4 loss of the packet transmitted in period T3. In period T4, a value for information to be contained in a packet transmitted in period T4 is determined based on information ("ON") contained in the packet transmitted in period T3 and information ("ON") on the operation portion immediately before period T4. In the example shown in FIG. 12B, a packet containing "ON" as a content of the operation input by the user is transmitted in period T4.

The packet transmitted in period T4 is also lost, and in period T5, a value for information to be contained in a packet to be transmitted in period T5 is determined based on information ("ON") contained in the packet transmitted in period T4 and information ("OFF") on the operation portion immediately before period T5. In the example shown in FIG. 12B, a packet containing "ON" as a content of the operation input by the user is transmitted in period T5.

Since the packet transmitted in period T5 is received by the reception side, the reception value on the reception side is changed from "OFF" to "ON" in period T5. Though delay by a period of transmission or an integer multiple thereof is caused, lowering in operability can be prevented from a point of view of the user as a result of reflection of the result of the operation input by the user himself/herself on processing.

Thus, when information processing apparatus 100 is unable to confirm reception of a previously transmitted packet by another information processing apparatus (the reception side), information processing apparatus 100 performs processing for having a next packet contain information based on information which represents a content of an operation input by the user and is contained in the previously transmitted packet and information which represents a content of the operation input by the user onto operation portion 102 and is obtained before transmission of the next packet. The processing may be performed in application 150 shown in FIG. 9 or in radio controller 124 of radio communication unit 120.

Typically, when it is determined that the previously transmitted packet is lost, in a next period, information which represents a content of the operation input by the user and is contained in the lost packet and information representing a content of a current operation input by the user are combined to determine information to be stored in the present packet. Information processing apparatus 100 may combine information which represents a content of the operation input by the user and is contained in one or more packets of which reception by another information processing apparatus (reception side) is not confirmed and information which represents a content of the operation input by the user and is obtained at the current time point and have the combined information contained in a next packet.

Various methods are assumed as such a method of combining information. For example, it is important for an operation portion such as a push button to sense an operation performed by a user. Therefore, when a plurality of status values obtained during a period for which combination of information can be made include a status value indicating that the user has performed an operation, that value may be output as a representative value.

For example, when a status value at the time when a user is performing no operation is defined as "0" and a status value at the time when the user performs an operation is defined as "1", a logical sum of the status values may be determined as a status value to be contained in a packet in each period.

When packets are lost consecutively a plurality of times, all pieces of information representing operation inputs by a user obtained during a period in which packets continue to be lost are preferably combined. For example, in FIG. 12B, a logical sum of status values for operation portion 102 obtained in period T3, period T4, and period T5 is employed as information to be contained in a packet transmitted in period T5. In each period, since information contained in an immediately preceding packet (a status value for operation portion 102) reflects previously obtained all status values for operation portion 102 and a status value for operation portion 102 obtained in that period, it is not necessary to consider all status values for operation portion 102 obtained in a plurality of periods. In each period, whether or not a packet transmitted immediately before is lost is determined, and when the packet is lost, a logical sum of a status value for operation portion 102 contained in the lost packet and a status value obtained in the present period is calculated to thereby determine information to be contained in a packet to be transmitted in that period.

Thus, when the information processing apparatus is unable to confirm reception of a most recently transmitted packet by another apparatus, the information processing apparatus performs processing for combining information which represents a content of an operation input by the user and is contained in the most recently transmitted packet and information which represents a content of an operation input by the user and is obtained at the current time point and having a next packet contain the combined information. In each period, information to be contained in a packet to be transmitted in the present period which is obtained by merging information in packets of which transmission has failed in preceding periods is determined. By performing such processing, consequently, information reflecting all packets of which transmission has failed consecutively a plurality of times can be transmitted in the present period.

Though one example of merging processing in which a status value is defined as "0" when a user is performing no operation and a status value is defined as "1" when a user performs an operation is described above, AND may be used when allocation of status values is reverse.

When a packet is lost a plurality of times, a status value which appears more frequently may be defined as a final output value among status values obtained during a period in which the packet is lost. Information to be contained in a packet to be transmitted in the present period may be determined based on a majority rule about information contained in the lost packet.

Since data different in characteristics from one another such as various outputs from a push button, an operation lever, a touch panel, and a sensor are transmitted in a batch, different logics may be applied to each part of data. By way of example, such combination that a logical sum is applied to the A button, AND is applied to the B button, and a maximum value is applied to the acceleration sensor is exemplified.

When a transmission packet is transmitted to the reception side, processing for combination as described above is once stopped, and when loss occurs next time, the processing is again performed.

Though information on operation portion 102 operated by a user is exemplified in the description above, limitation thereto is not intended, and any information may be compensated for with the method as described above and contained in a packet, and the packet may be transmitted.

By adopting such processing for compensating for transmission data, even when a packet is lost due to temporary deterioration of a communication environment or the like, game processing or the like can proceed without compromising operability of a user.

[I. Modification]

In the embodiment described above, though an example in which any data (for example, input data) obtained by information processing apparatus 100 (operation controller) is transmitted to information processing apparatus 200 (processing main body) is described as a typical application example, retransmission processing and non-retransmission processing can be applied also to transmission of data in a reverse direction. Resending processing and non-retransmission processing according to the present embodiment are applicable also to transmission of data for having information processing apparatus 100 (operation controller) perform some output processing based on an operation value calculated in information processing apparatus 200 (processing main body).

[J. Advantages]

According to information processing system 1 according to the present embodiment, a more flexible form of transmission can be realized depending on a type of data in a configuration for wirelessly transmitting and receiving a packet through synchronous communication to and from another apparatus.

According to information processing system 1 according to the present embodiment, even when synchronous communication is performed in non-retransmission processing, loss of information representing an operation input by a user can be compensated for and operability of a user can be maintained.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. An information processing apparatus, comprising:
  a radio module configured to wirelessly transmit and receive a packet through synchronous communication to and from another apparatus; and
  a processor configured to:
    determine whether the packet transmitted from the radio module has been received by the another apparatus; and
    select, when reception of a previously transmitted packet by the another apparatus is not confirmed, between retransmission processing for retransmitting the previously transmitted packet and non-retransmission processing for transmitting another packet instead of the previously transmitted packet, wherein
    selection between retransmission processing and non-retransmission processing is determined based on a content of the previously transmitted packet, and
    during non-retransmission processing, the another packet is transmitted instead of the previously transmitted packet while maintaining a same sequence information as the previously transmitted packet.

2. The information processing apparatus according to claim 1, wherein the packet transmitted from the radio module contains first sequence information of which value is varied in accordance with prescribed rules each time the packet is transmitted or received,
  the processor determines whether the packet transmitted from the radio module has been received by the another apparatus based on the first sequence information, and
  the radio module provides the first sequence information of which value has been varied in accordance with the prescribed rules to a packet to be transmitted in any of the retransmission processing and the non-retransmission processing.

3. The information processing apparatus according to claim 2, further comprising:
  a buffer memory configured to store data to be contained in one or more packets to be transmitted, wherein
  data corresponding to the previously transmitted packet which is stored in the buffer memory is removed independently of the first sequence information in the non-transmission process.

4. The information processing apparatus according to claim 2, wherein
the packet transmitted from the radio module contains second sequence information of which value is incremented each time data to be transmitted is generated.

5. The information processing apparatus according to claim 4, wherein
the first sequence information is used for determining whether an individual packet has reached a destination, and
the second sequence information is used for determining whether all of data necessary for an application at the destination have been received.

6. The information processing apparatus according to claim 2, wherein
the packet transmitted from the radio module contains second sequence information of which value is incremented each time data is transmitted.

7. The information processing apparatus according to claim 6, wherein
the second sequence information is longer in data length than the first sequence information.

8. The information processing apparatus according to claim 1, wherein
the packet transmitted from the radio module contains information indicating whether the packet has been transmitted in accordance with the retransmission processing or the non-retransmission processing.

9. The information processing apparatus according to claim 1, wherein
the radio module transmits information indicating that the information processing apparatus has an ability of the non-retransmission processing.

10. The information processing apparatus according to claim 1, further comprising:
an operation portion configured to accept an operation input by a user, wherein
the radio module has the packet contain information representing a content of the operation input by the user onto the operation portion.

11. The information processing apparatus according to claim 10, further comprising:
a detector configured to sense at least one of an attitude and a motion of the information processing apparatus, wherein
the radio module has the packet contain information representing a result of sensing by the detector.

12. The information processing apparatus according to claim 10, wherein
the processor prohibits the non-retransmission processing of a packet containing information on calibration of at least one of the operation portion and a detector.

13. The information processing apparatus according to claim 1, wherein
the radio module transmits and receives the packet with a communication channel to be used being switched among a plurality of communication channels at any timing in accordance with frequency hopping.

14. The information processing apparatus according to claim 1, further comprising:
a storage configured to temporarily hold a program to be installed in the another apparatus, wherein
the processor prohibits the non-retransmission processing of a packet containing entirety or a part of the program to be installed in the another apparatus.

15. The information processing apparatus according to claim 1, wherein
the processor has a next packet contain information based on (a) information which represents a content of an operation input by a user and is contained in the previously transmitted packet and (b) information which represents a content of an operation input by the user onto an operation portion and is obtained before transmission of the next packet, when the non-retransmission processing has been selected and reception of the previously transmitted packet by the another apparatus is not confirmed.

16. The information processing apparatus according to claim 15, wherein
the processor combines (a) information which represents the content of the operation input by the user and is contained in one or more packets of which reception by the another apparatus is not confirmed and (b) information which represents the content of the operation input by the user and is obtained at a current time point and has the next packet contain the combined information.

17. The information processing apparatus according to claim 15, wherein
the processor combines (a) information which represents the content of the operation input by the user and is contained in a most recently transmitted packet and (b) information which represents the content of the operation input by the user and is obtained at a current time point and has the next packet contain the combined information when reception of the most recently transmitted packet by the another apparatus is not confirmed.

18. The information processing apparatus according to claim 1, wherein selection between retransmission processing and non-retransmission processing is determined based on a type of data in the previously transmitted packet.

19. The information processing apparatus according to claim 1, wherein data stored in the another packet is different than data stored in the previously transmitted packet.

20. An information processing method, comprising:
wirelessly transmitting and receiving a packet through synchronous communication to and from another apparatus;
determining whether the transmitted packet has been received by the another apparatus; and
selecting, when reception of a previously transmitted packet by the another apparatus is not confirmed, between retransmission processing for retransmitting the previously transmitted packet and non-retransmission processing for transmitting another packet instead of the previously transmitted packet, wherein
selection between retransmission processing and non-retransmission processing is determined based on a content of the previously transmitted packet, and
during non-retransmission processing, the another packet is transmitted instead of the previously transmitted packet while maintaining a same sequence information as the previously transmitted packet.

21. An information processing system, comprising:
processing including at least a processor configured to execute a control program; and
a radio module configured to wirelessly transmit and receive a packet through synchronous communication to and from another apparatus,
wherein the processing circuitry is configured to:
determine whether the packet transmitted from the radio module has been received by the another apparatus, and select, when reception of the previously transmitted packet by the another apparatus is not confirmed, between retransmission processing for retransmitting the previously transmitted packet and non-retransmission processing for transmitting another packet instead of the previously transmitted packet, wherein selection between retransmission processing and non-retransmission processing is determined based on a content of the previously transmitted packet, and during non-retransmission processing, the another packet is transmitted instead of the previously transmitted packet while maintaining a same sequence information as the previously transmitted packet.

22. A non-transitory computer-readable storage medium having an executable control program stored thereon, the control program being executed by a processor of an apparatus having a radio communication device configured to wirelessly transmit and receive a packet through synchronous communication to and from another apparatus, the control program causing the processor to provide execution comprising:

determining whether the packet transmitted from the radio communication device has been received by the another apparatus; and selecting, when reception of the previously transmitted packet by the another apparatus is not confirmed, between retransmission processing for retransmitting the previously transmitted packet and non-retransmission processing for transmitting another packet instead of the previously transmitted packet, wherein selection between retransmission processing and non-retransmission processing is determined based on a content of the previously transmitted packet, and during non-retransmission processing, the another packet is transmitted instead of the previously transmitted packet while maintaining a same sequence information as the previously transmitted packet.

\* \* \* \* \*